United States Patent
Le Roux et al.

(10) Patent No.: US 10,008,721 B2
(45) Date of Patent: Jun. 26, 2018

(54) ELECTRODE MATERIAL OF FORMULA LIMN$_x$CO$_{1-x}$BO$_3$ AND PRODUCTION METHOD THEREOF

(71) Applicant: COMMISSARIAT A L'ENERGIE ATOMIQUE ET AUX ENERGIES ALTERNATIVES, Paris (FR)

(72) Inventors: Barbara Le Roux, Grenoble (FR); Carole Bourbon, Saint Michel de Saint Geoirs (FR); Valérie Pralong, Caen (FR); Jean-François Colin, Meylan (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days. days.

(21) Appl. No.: 15/510,515

(22) PCT Filed: Aug. 24, 2015

(86) PCT No.: PCT/FR2015/052252
§ 371 (c)(1),
(2) Date: Mar. 10, 2017

(87) PCT Pub. No.: WO2016/059305
PCT Pub. Date: Apr. 21, 2016

(65) Prior Publication Data
US 2017/0294655 A1 Oct. 12, 2017

(30) Foreign Application Priority Data
Oct. 17, 2014 (FR) ..................................... 14 60002

(51) Int. Cl.
C01B 35/12 (2006.01)
H01M 4/58 (2010.01)
H01M 10/0525 (2010.01)
H01M 4/02 (2006.01)

(52) U.S. Cl.
CPC ......... *H01M 4/5825* (2013.01); *C01B 35/128* (2013.01); *H01M 10/0525* (2013.01); *C01P 2002/72* (2013.01); *C01P 2004/03* (2013.01); *C01P 2006/40* (2013.01); *H01M 2004/028* (2013.01)

(58) Field of Classification Search
CPC .... H01M 4/525; H01M 4/5825; C01B 35/128
See application file for complete search history.

(56) References Cited

U.S. PATENT DOCUMENTS

2013/0209859 A1* 8/2013 Tsuruta ................... H01G 9/06
429/142

OTHER PUBLICATIONS

Kim, Jae Chul, "Design of Novel Lithium Storage Materials with a Polyanionic Framework" Doctoral Thesis, Massachusetts Institute of Technology (May 14, 2014).*
International Search Report (and English Translation thereof) and Written Opinion issued in PCT/FR2015/052252, dated Oct. 30, 2015.
Yamada, A., et al., "Synthesis and electrochemistry of monoclinic Li(Mn$_x$Fe$_{1-x}$)BO$_3$: a combined experimental and computational study", Journal of Materials Chemistry, vol. 21, pp. 10690-10696 (2011).
LeGagneur, V., et al., "LiMBO$_3$ (M=Mn, Fe, Co): synthesis, crystal structure and lithium deinsertion/insertion properties", Solid State Ionics, vol. 139, pp. 37-46 (2001).
Belkébir, A., et al., "Synthesis, structural and vibrational analysis of LiMBO$_3$ orthoborates (M=Mg, Co, Zn)", New J. Chem., vol. 20, pp. 311-316 (1996).

* cited by examiner

*Primary Examiner* — Peter F Godenschwager
(74) *Attorney, Agent, or Firm* — Heslin Rothenberg Farley & Mesiti P.C.

(57) ABSTRACT

The present invention relates to an electrode material of formula LiMn$_x$Co$_{1-x}$BO$_3$, where 0<x<1, and to a method of preparing the same comprising independently preparing a manganese borate and a cobalt borate and then simultaneously thermally treating them under an inert atmosphere, in the presence of a precursor of lithium and of boric acid.

20 Claims, 6 Drawing Sheets

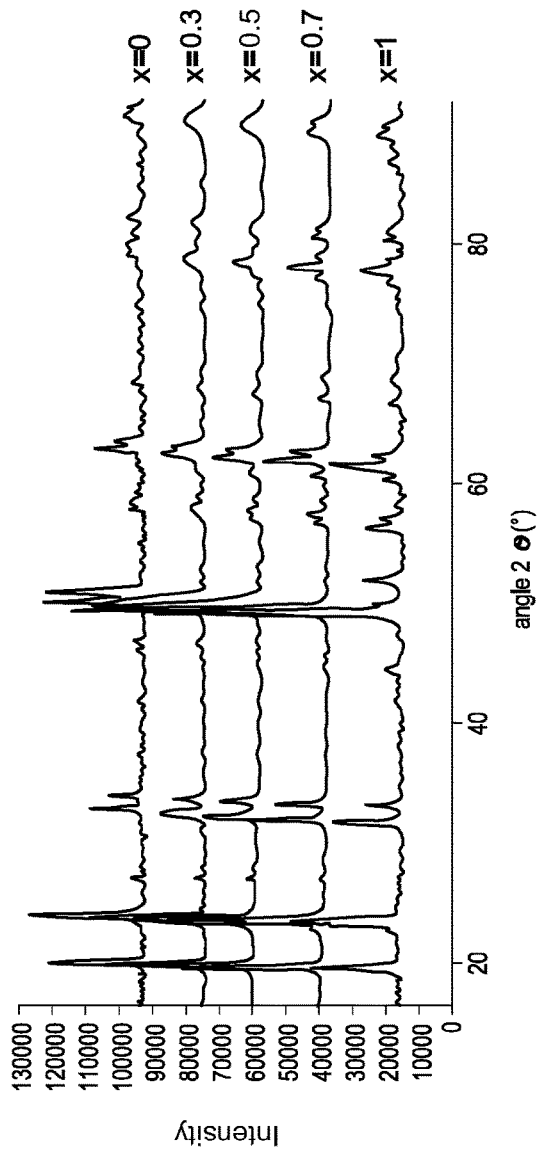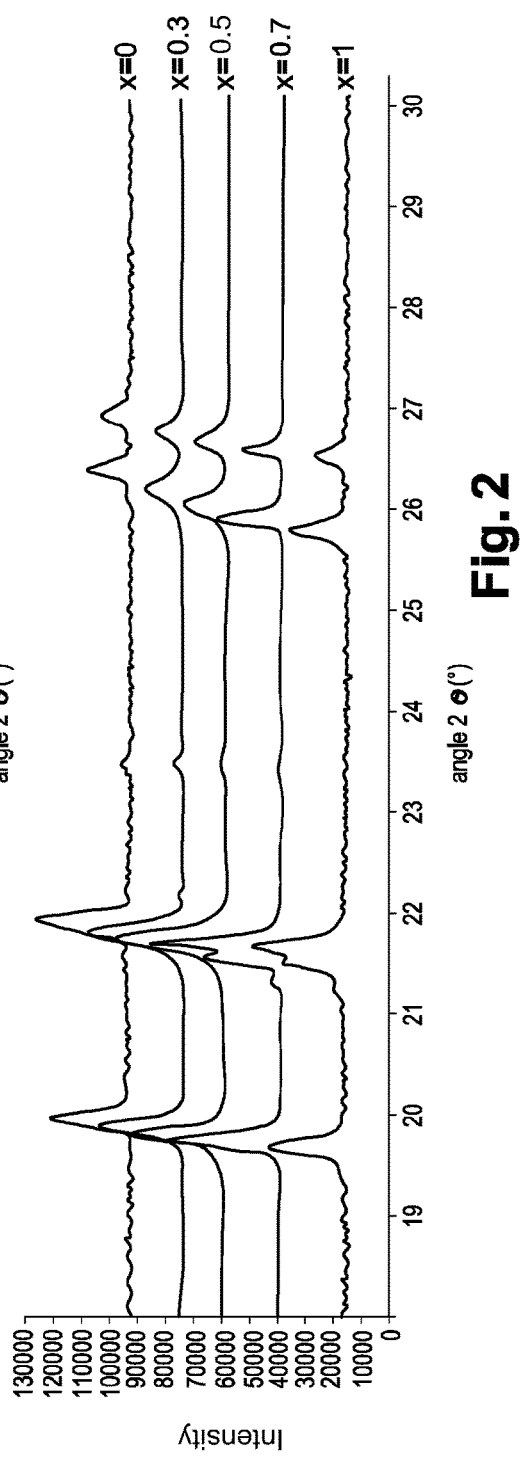

ELECTRODE MATERIAL OF FORMULA LIMN$_x$CO$_{1-x}$BO$_3$ AND PRODUCTION METHOD THEREOF

CROSS REFERENCE TO RELATED APPLICATIONS

This application is a national stage filing under section 371 of International Application No. PCT/FR2015/052252, filed on Aug. 24, 2015, and published on Apr. 21, 2016 as WO 2016/059305, which claims priority to French Application No. 1460002, filed on Oct. 17, 2014. The entire contents of each of said applications are hereby incorporated herein by reference.

DOMAIN OF THE INVENTION

The present invention relates to a material made from lithium-borate having formula LiMn$_x$Co$_{1-x}$BO$_3$, as well as to the use thereof as an electrode material and to its preparation method.

The field of application of this material relates to power storage, and more particularly to lithium-ion batteries.

BACKGROUND

During the last decades, different types of batteries have been developed to respond to size, weight, and capacity requirements depending on the nature of the electronic devices. For example, lithium-ion batteries are particularly well adapted to portable electronic equipment in terms of energy density and of time stability (charge/discharge cycles).

Generally, a lithium-ion battery is an assembly of a positive electrode (cathode), comprising a lithium-based material, and of a negative electrode (anode) generally made from carbon (graphite, for example). Its operation is ensured by the reversible exchange of Li$^+$ ions between the cathode and the anode, the electrodes being separated by an electrolyte based on lithium salt.

In the development of lithium-ion batteries, many positive electrode materials have been tested, and particularly LiMPO$_4$ phosphates (M=Mn, Fe, or Co). Such materials are advantageous and arouse much interest due to the security that they provide and to their low cost. However, their theoretical specific capacity remains limited to 170 mAh/g for LiFePO$_4$.

To obtain batteries having higher specific capacities, other materials have been envisaged, particularly LiMBO$_3$ borates, with M=Mn, Fe, or Co. Such materials have the advantage of having a maximum theoretical capacity (220 mAh/g) greater than that of LiMPO$_4$ phosphates, while being as attractive in terms of security.

However, the redox potentials of couples Fe$^{2+}$/Fe$^{3+}$ and Mn$^{2+}$/Mn$^{3+}$ are relatively low, which results in limiting the energy density of the LiFeBO$_3$ and LiMnBO$_3$ compounds.

The LiCoBO$_3$ compound enables to improve the energy density, given that the Co$_{2+}$/Co$^{3+}$ redox couple of cobalt has a higher potential than that of couples Fe$^{2+}$/Fe$^{3+}$ and Mn$^{2+}$/Mn$^{3+}$. However, the disadvantage of the LiCoBO$_3$ compound with respect to LiFeBO$_3$ and LiMnBO$_3$ compounds is its rather low experimental reversible capacity.

There thus is a need to improve the properties of lithium-borate materials, by developing a material having the following properties:
a higher average potential;
a good specific mass capacity; and
a good stability over time regarding charge/discharge cycles.

The present invention relates to lithium-borate compounds, having properties enabling to solve this problem. They comprise at the same time the two transition metals, manganese and cobalt.

Further, the Applicant has observed that prior art methods do not enable to prepare such compounds comprising at the same time lithium manganese and cobalt borates. Such methods do not result in the forming of a single phase containing the manganese and the cobalt.

To overcome this technical issue, the Applicant has developed a novel method in a plurality of steps, which takes into account possible incompatibilities relative to the respective reactivities of the cobalt and manganese compounds.

SUMMARY OF THE SPECIFICATION

The present invention aims at a lithium-borate material containing both manganese and cobalt. The partial substitution of manganese with cobalt in the LiMnBO$_3$ material enables to improve the energy density.

This material may be used in various fields of application, particularly in the field of energy storage. It appears to be particularly attractive to form the electronically-active material of the cathode of a lithium-ion battery.

More particularly, the present invention aims at a material of formula LiMn$_x$Co$_{1-x}$BO$_3$ where 0<x<1.

Advantageously, x is greater than 0 and smaller than or equal to 0.7 and, more advantageously, x=0.7.

This material appears in crystal form and crystallizes in a monoclinic cell.

As already indicated, the partial substitution of manganese or of iron in LiMBO$_3$—type materials (M=Mn or Fe) with cobalt enables to increase the reaction potential of the lithium-borate material. Thus, such a partial substitution enables to increase the energy density of this material.

The LiMn$_x$Co$_{1-x}$BO$_3$ material (0<x<1) thus has the required properties to be used as an electrode material, be it in terms of security or of specific mass capacity. These advantages are due to the presence of borate BO$_3$ but also to the redox potential of couple Co$^{2+}$/Co$^{3+}$, which is higher than that of couples Fe$^{2+}$/Fe$^{3+}$ and Mn$^{2+}$/Mn$^{3+}$.

This material is particularly adapted to form the material of a cathode, particularly of a lithium-ion battery.

It has a theoretical specific mass capacity in the range from 215 to 222 mAh/g.

The present invention further aims at a lithium-ion battery comprising the material of formula LiMn$_x$Co$_{1-x}$BO$_3$ (0<x<1) as an active electrode material, advantageously as a cathode material.

The present invention also aims at a method of solid-state preparation of a material of formula LiMn$_x$Co$_{1-x}$BO$_3$ (with 0<x<1, advantageously 0<x<0.7), comprising the steps of:
a) preparing a manganese borate from a manganese compound and a boron compound by:
   a1) milling of a mixture of a manganese compound and of a boron compound;
   a2) thermal treatment of this mixture (milled) under an inert atmosphere, advantageously under argon, at a temperature in the range from 300 to 900° C.;
b) preparing a cobalt borate from a mixture of a cobalt compound and of a boron compound by:
   b1) milling of a mixture of a cobalt compound and of a boron compound;

b2) thermal treatment of this mixture (milled) under an oxidizing atmosphere, preferably in air, at a temperature in the range from 300 to 1,000° C.;

c) preparing a mixture containing the manganese borate, the cobalt borate, a precursor of lithium, and boric acid;

d) thermally treating the mixture thus obtained under an inert atmosphere;

e) obtaining the material of formula $LiMn_xCo_{1-x}BO_3$, with $0<x<1$.

The thermal treatment of step d) may be preceded with a milling step.

In the two steps a) and b), the boron compound used may be identical or different.

At step a), the molar ratio between the manganese compound and the boron compound is advantageously in the range from 0.6 to 1.2, more advantageously from 0.8 to 1.

Molar ratio means the molar ratio of the molar quantity of manganese to the molar quantity of boron.

Advantageously, the manganese compound used at step a) may be selected from the group comprising: manganese oxalate ($MnC_2O_4$ in its hydrated or non-hydrated form); manganese carbonate ($MnCO_3$); and manganese oxide (II) (MnO). It may also be a mixture of these compounds.

Advantageously, it is manganese oxalate.

At step b), the molar ratio between the cobalt compound and the boron compound is advantageously in the range from 0.6 to 1.2, more advantageously from 0.8 to 1.

Molar ratio means the molar ratio of the molar quantity of cobalt to the molar quantity of boron.

Advantageously, the cobalt compound used at step b) may be selected from the group comprising: cobalt oxalate ($CoC_2O_4$ in its hydrated or non-hydrated form); cobalt carbonate ($CoCO_3$); and cobalt oxide (II) (CoO). It may also be a mixture of these compounds.

Advantageously, it is cobalt oxalate.

The boron compounds used at steps a) and b) are advantageously, and independently from each other, boron oxide ($B_2O_3$) or boric acid ($H_3BO_3$). It may also be a mixture of these compounds.

Advantageously, it is $B_2O_3$.

The milling of steps a1) and b1) may be performed by any adapted means known by those skilled in the art. It enables to reduce the solid manganese, cobalt, and boron compounds to a fine powder.

The milling enables not only to obtain a fine homogeneous powder, but also to increase the specific surface area of these compounds and thus to improve their reactivity.

Advantageously, the milling of steps a1) and/or b1) may be carried out in a conventional ball mill.

According to a specific embodiment, when the mill is a ball mill, the rotation speed of the mill is advantageously in the range from 100 to 900 revolutions/minute, more advantageously from 250 to 750 revolutions/minute. It may also be equal to 500 revolutions/minute.

Advantageously, the duration of the milling of steps a1) and/or b1) is advantageously in the range from 0.5 to 24 hours, more advantageously from 1 to 12 hours. It may in particular be equal to 5 hours.

Preferably, the milled product resulting from step a1) or b1) appears in the form of a powder having an average grain diameter advantageously in the range from 0.1 to 30 micrometers, and more advantageously from 0.5 to 10 micrometers.

The milling conditions of steps a1) and b1) are independent from one another. In other words, the milling conditions for manganese are not necessarily the same as for cobalt. Further, the average grain diameter of the mixture resulting from step a1) (manganese) is not necessarily the same as that of the mixture resulting from step b1) (cobalt).

The thermal treatment (calcination) of the step a2) or b2), which follows mixing (and advantageously milling) step a1) or b1), enables the manganese or cobalt compound to react with the boron compound to produce a manganese borate or a cobalt borate.

As previously indicated, the thermal treatment of steps a2) and b2) is carried out under a different atmosphere for each material:

a2) under an inert atmosphere (advantageously, argon) to avoid the oxidation of manganese II+ into manganese III+; and b2) in air to avoid the reduction of the cobalt II+, which quite easily occurs at temperatures higher than or equal to 500° C. under an inert atmosphere, particularly with the cobalt precursors used.

For these reasons, the manganese and cobalt borates ($M_3B_2O_6$) are prepared separately, prior to the synthesis of the $LiMn_xCo_{1-x}BO_3$ compound by subsequent thermal treatment under an inert atmosphere at step d) and this, without reducing the cobalt II+ into metal cobalt.

Preferably, the thermal treatment according to step a2) comprises heating the mixture resulting from step a1) up to a temperature in the range from 300 to 900° C., more advantageously from 500 to 800° C. The temperature may be in the range from 600 to 750° C., particularly when the thermal treatment is a thermal quenching such as described hereafter.

Preferably, the thermal treatment according to step a2) comprises heating the mixture resulting from step b1) up to a temperature in the range from 300 to 1,000° C., more advantageously from 550 to 850° C. The temperature may be in the range from 700 to 850° C., particularly when the thermal treatment is a thermal quenching such as described hereafter.

The temperature of the thermal treatment (a2 and/or b2) is reached by applying a heating speed, advantageously in the range from 1 to 20° C./minute, more advantageously from 2 to 10° C./minute.

The duration of the thermal treatment (a2 and/or b2) is advantageously in the range from 5 to 1,200 minutes, more advantageously from 5 to 20 minutes, and more advantageously still from 5 to 15 minutes.

Advantageously, the thermal treatment (a2 and/or b2) may be a step of thermal quenching, that is, a treatment which comprises no progressive temperature rise.

At the end of step a2) or b2), the manganese or cobalt borate is cooled. The cooling speed is advantageously in the range from 2 to 20° C./minute, more advantageously from 5 to 10° C./minute, until the room temperature is reached.

Advantageously, the cooling is an air quenching step, that is, a treatment comprising no progressive temperature decrease. It is thus instantaneously passed from the thermal treatment temperature to the room temperature. For manganese borate, it is an air quenching of the vessel (tube, for example) containing the sample (the closed vessel containing the sample is taken out in air but remains under an inert atmosphere).

The duration of the thermal treatment (a2 and/or b2) does not include the heating or cooling time.

The conditions of the thermal treatment of steps a2) and b2) are independent. In other words, the heating speed, the duration, and the temperature of the thermal treatment, and the cooling speed relative to manganese borate are not necessarily the same as those relative to cobalt borate.

Further, the thermal treatment conditions, relative to the inert or oxidizing atmosphere, are adapted to the reactivity of the manganese and cobalt compounds. Such a condition difference at steps a2) and b2) enables to subsequently obtain the monoclinic crystal compound of formula $LiMn_xCo_{1-x}BO_3$ (with $0<x<1$).

The absence of conditions specific to the forming of each of the borates does not allow the forming of this compound.

Once steps a) and b) have been carried out, the manganese borate and the cobalt borate are mixed (and advantageously milled) in the presence of a precursor of lithium and of boric acid (step c)).

It will be within the abilities of those skilled in the art to adjust the respective quantities of these compounds to obtain the material of formula $LiMn_xCo_{1-x}BO_3$ (with $0<x<1$).

According to a specific embodiment, the mixture of step c) may comprise, for one mole of lithium:
from 0.01 to 0.5 moles of manganese borate, advantageously from 0.03 to 0.35 moles;
from 0.01 to 0.5 moles of cobalt borate, advantageously from 0.03 to 0.35 moles;
from 0.001 to 0.5 moles of boric acid, advantageously from 0.01 to 0.35 moles.

Advantageously, the lithium precursor may be lithium carbonate ($Li_2CO_3$) or lithium hydroxide (LiOH in its hydrated or non-hydrated form). It may also be a mixture of these compounds.

The optional milling preceding step d) is advantageously carried out in a ball mill. In this case, the mill rotation speed is advantageously in the range from 100 to 900 revolutions/minute, more advantageously from 250 to 750 revolutions/minute.

The duration of the optional milling preceding step d) is advantageously in the range from 0.5 to 24 hours, more advantageously from 1 to 12 hours.

The optional milling preceding step d) enables to obtain a homogeneous powder having an average diameter advantageously in the range from 0.1 to 30 micrometers, more advantageously from 0.5 to 10 micrometers.

The mixture resulting from step c) (possibly milled) is then thermally treated (step d)).

The thermal treatment temperature of step d) is advantageously in the range from 300 to 900° C., more advantageously from 400 to 700° C., and more advantageously still from 400 to 600° C. It may in particular be in the range from 400 to 550° C. when the thermal treatment is a thermal quenching such as described hereafter.

The heating speed is advantageously in the range from 1 to 20° C./minute, more advantageously from 2 to 10° C./minute.

As already indicated, the thermal treatment of step d) is performed under an inert atmosphere, for example, under argon, or under nitrogen. Preferably, it is performed under argon.

The duration of the thermal treatment of step d) is advantageously in the range from 15 to 1,200 minutes, more advantageously from 30 to 1,200 minutes, and more advantageously still from 45 to 180 minutes. It may in particular be equal to 120 minutes.

Advantageously, the thermal treatment may be a step of thermal quenching, that is, a treatment which comprises no progressive temperature rise. In such conditions, the duration of the thermal treatment may advantageously be in the range from 15 to 120 minutes, particularly from 400 to 550° C.

At the end of step d), the material is cooled. The cooling speed is advantageously in the range from 2 to 20° C./minute, more advantageously from 5 to 10° C./minute, until the room temperature is reached.

Advantageously, the cooling is a step of air quenching of the vessel (tube, for example) containing the sample (the closed vessel containing the sample is taken out in air but it remains under an inert atmosphere), that is, a treatment comprising no progressive temperature decrease. It is thus instantaneously passed from the thermal treatment temperature to the room temperature.

The duration of the thermal treatment of step d) does not include the heating or cooling time.

The final product obtained at step e) is a material of formula $LiMn_xCo_{1-x}BO_3$ where x is greater than 0 and smaller than 1. In other words, the material necessarily comprises manganese or cobalt.

It is a crystalline material, which crystallizes in a monoclinic cell.

The average diameter of the agglomerates obtained after the thermal treatment of step d) is advantageously in the range from 0.5 to 10 micrometers, more advantageously from 0.5 to 5 micrometers. It depends, in particular, on the nature of the thermal treatment. It is advantageously in the range from 1 to 5 micrometers in the case of thermal quenching, while it is advantageously in the range from 4 to 10 micrometers when the thermal treatment does not correspond to a quenching step.

The average diameter of the primary particles forming the agglomerates and obtained after the thermal treatment of step d) is advantageously in the range from 0.1 to 1 micrometer, more advantageously from 0.1 to 0.5 micrometer. It depends, in particular, on the nature of the thermal treatment. It is advantageously in the range from 0.1 to 0.4 micrometer in the case of thermal quenching, while it is advantageously in the range from 0.5 to 1 micrometer when the thermal treatment does not correspond to a quenching step.

According to an advantageous embodiment, the method comprises the steps of:
a) preparing a manganese borate from a manganese compound and a boron compound, by thermal quenching under an inert atmosphere at a temperature in the range from 600 to 750° C. for a duration in the range from 5 to 20 minutes;
b) preparing a cobalt borate from a cobalt compound and a boron compound, by thermal quenching under an oxidizing atmosphere at a temperature in the range from 700 to 850° C. for a duration in the range from 5 to 20 minutes;
c) preparing and milling a mixture containing the manganese borate, the cobalt borate, a precursor of lithium, and boric acid;
d) thermally quenching the mixture under an inert atmosphere, at a temperature in the range from 400 to 550° C. for a duration in the range from 15 to 120 minutes;
e) obtaining the material of formula $LiMn_xCo_{1-x}BO_3$, with $0<x<1$.

As already indicated, the present invention also relates to the use of the $LiMn_xCo_{1-x}BO_3$ material ($0<x<1$) as an electrode material, and particularly as a cathode material in a lithium-ion battery. It also relates to a lithium-ion battery comprising a cathode where the electronically-active material is the $LiMn_xCo_{1-x}BO_3$ material ($0<x<1$).

It will be within the abilities of those skilled in the art to implement conventional techniques to prepare this cathode, particularly by deposition of the material on a current collector.

As an example, the deposition may be that of an ink containing the active electrode material previously milled in the presence of an electronic conductor Typically, the electronic conductors used are vapor grown carbon fibers (VGCF), or more advantageously carbon black such as Ketjenblack®.

The invention and the resulting advantages will better appear from the following non-limiting drawings and examples, provided as an illustration of the invention.

DESCRIPTION OF THE DRAWINGS

FIG. 1 corresponds to the diffractograms of the LiMn$_x$Co$_{1-x}$BO$_3$ compounds when x=0; 0.3; 0.5; 0.7; and 1.

FIG. 2 corresponds to an enlarged view of the diffractograms of the LiMn$_x$Co$_{1-x}$BO$_3$ compounds when x=0; 0.3; 0.5; 0.7; and 1.

EMBODIMENTS OF THE INVENTION

Figure 3:
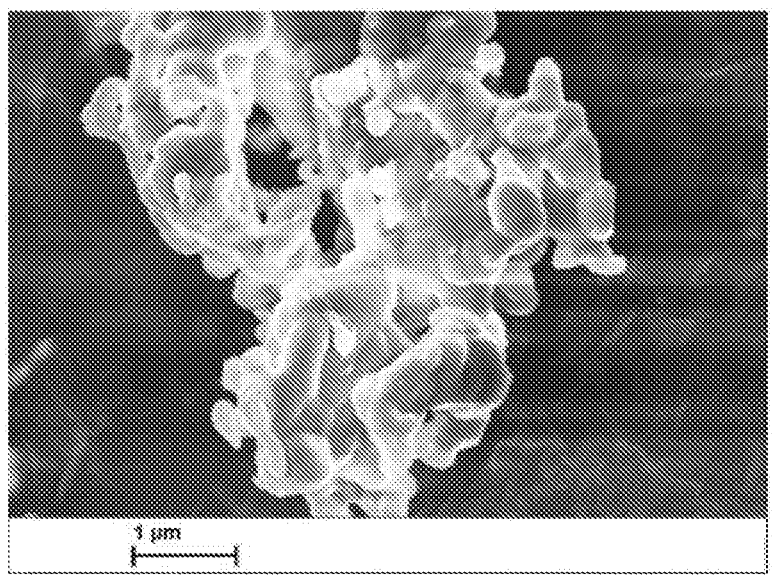
FIG. 3 is an image obtained by scanning electron microscopy (SEM) of the LiMn$_{0.5}$Co$_{0.5}$BO$_3$ compound according to a specific embodiment of the invention.

Compounds of formula LiMn$_x$Co$_{1-x}$BO$_3$ have been prepared according to two embodiments of the invention (methods A and B) and according to a method corresponding to a counter-example (method C).

1/ Method A: Preparation of the LiMn$_x$Co$_{1-x}$BO$_3$ Compound (x=0; 0.3; 0.5; 0.7; 1)

The LiMn$_x$Co$_{1-x}$BO$_3$ compound has been prepared according to the steps of:
a) preparing a manganese borate from a manganese compound and a boron compound;
b) preparing a cobalt borate from a cobalt compound and a boron compound;
c) preparing and milling a mixture containing the manganese borate, the cobalt borate, a precursor of lithium, and boric acid;
d) thermally treating the mixture under an inert atmosphere;
e) obtaining the material of formula LiMn$_x$Co$_{1-x}$BO$_3$, with 0<x<1.

Step a):
In a ball mill, 6.76 g of MnC$_2$O$_4$.2H$_2$O and 1.32 g of B$_2$O$_3$ are dispersed in cyclohexane. The mixture is milled at a speed of 500 revolutions/minute for 5 hours. The used mill is a planetary mill (Retsch) containing 10 stainless steel balls. The cyclohexane is then evaporated in air.

The milled mixture (manganese/boron) is thermally treated at 700° C. for 6 hours (5° C./min heating speed) under an inert atmosphere.

The manganese borate thus obtained is then gradually cooled with a cooling temperature equal to 10° C./minute down to 25° C.

Step b):
Concurrently, in another ball mill, 7.32 g of CoC$_2$O$_4$.2H$_2$O and 1.39 g of B$_2$O$_3$ are dispersed in cyclohexane. The mixture is milled at a speed of 500 revolutions/minute for 5 hours. The mill used is a planetary mill (Retsch) containing 10 stainless steel balls. The cyclohexane is then evaporated in air.

The milled mixture (cobalt/boron) is thermally treated at 800° C. for 6 hours (heating speed equal to 5° C./min) under an oxidizing atmosphere. The cobalt borate thus obtained is then gradually cooled with a cooling temperature equal to 10° C./minute down to 25° C.

Step c):
0.86 g of the obtained manganese borate and 0.80 g of the obtained cobalt borate are mixed with 0.63 g of Li$_2$CO$_3$, and 0.17 g of H$_3$BO$_3$ in a ball mill. The mixture is dispersed in cyclohexane and then milled at a speed of 500 revolutions/minute for 5 hours. The used mill is a planetary mill (Retsch) containing 10 stainless steel balls. The cyclohexane is then evaporated in air.

Steps d) and e):
The milled mixture resulting from step c) is thermally treated under argon, at 500° C. for 6 hours (heating speed equal to 5° C./min).

The LiMn$_{0.5}$Co$_{0.5}$BO$_3$ compound thus obtained is then gradually cooled with a cooling temperature equal to 10° C./minute down to 25° C.

By adapting the quantities of components used, the LiMn$_x$Co$_{1-x}$BO$_3$ materials, with x=0; 0.3; 0.7; 1 have been prepared in the same way.

| Masses used for step c) for the LiMn$_x$Co$_{1-x}$BO$_3$ materials | | | | |
|---|---|---|---|---|
| x | Mn borate | Co borate | lithium carbonate | boric acid |
| 0.3 | 0.51 g | 1.10 g | 0.63 g | 0.23 g |
| 0.5 | 0.86 g | 0.80 g | 0.63 g | 0.17 g |
| 0.7 | 1.22 g | 0.48 g | 0.63 g | 0.10 g |

2/ Method B: Synthesis of LiMn$_{0.7}$Co$_{0.3}$BO$_3$ by Thermal Quenching

Method B comprises the same steps as method A but decreases the duration of the thermal treatments. In this case, it is a thermal quenching.

Step a):
In a ball mill, 6.76 g of MnC$_2$O$_4$.2H$_2$O and 1.32 g of B$_2$O$_3$ are dispersed in cyclohexane. The mixture is milled at a speed of 500 revolutions/minute for 5 hours. The used mill is a planetary mill (Retsch) containing 10 stainless steel balls. The cyclohexane is then evaporated in air.

The milled mixture (manganese/boron) is thermally treated at 700° C. for 15 minutes under an inert atmosphere (air quenching).

Step b):
Concurrently, in another ball mill, 7.32 g of CoC$_2$O$_4$.2H$_2$O and 1.39 g of B$_2$O$_3$ are dispersed in cyclohexane. The mixture is milled at a speed of 500 revolutions/ minute for 5 hours. The used mill is a planetary mill (Retsch) containing 10 stainless steel balls. The cyclohexane is then evaporated in air.

The milled mixture (cobalt/boron) is thermally treated at 800° C. for 15 minutes under an oxidizing atmosphere.

Step c):

1.22 g of the obtained manganese borate and 0.48 g of the obtained cobalt borate are dispersed in cyclohexane with 0.63 g of $Li_2CO_3$ and 0.10 g of $H_3BO_3$ in a ball mill. The mixture is milled at a speed of 500 revolutions/minute for 5 hours. The used mill is a planetary mill (Retsch) containing 10 stainless steel balls. The cyclohexane is then evaporated in air.

Steps d) and e):

The milled mixture resulting from step c) is thermally treated under argon, at 500° C. for 1 hour and 15 minutes (without undergoing the temperature rise and with an air quenching).

3/ Electrochemical Tests a) Preparation of the positive electrode

The active $LiMn_xCo_{1-x}BO_3$ material is mixed by 85 wt. % with a carbon of large specific surface area (Ketjen black JD600) (15 wt. %) for 4 hours at 500 revolutions per minute in a 50-mL bowl containing 10 stainless steel balls by means of a planetary mill (Retsch).

Then, the obtained product is mixed by 90 wt. % with polyvinylidene fluoride (10 wt. %) dissolved in N-methyl-2-pyrrolidone.

Finally, the mixture is spread on an aluminum foil (100-micrometer thickness) and then dried at 60° C.

The electrode is then made of 76.5 wt. % of active material; 13.5 wt. % of carbon, and 10 wt. % of polyvinylidene fluoride (PVDF).

b) Mounting of the accumulator

The positive electrode thus formed is introduced into a cell of "button cell" type at format 2032. The negative electrode is made of metal lithium.

Two types of separators are used: one made of a polypropylene film (Celgard® 2400) and the other made of polyolefin (Viledon®).

The electrolyte used is made of ethylene carbonate, of propylene carbonate, of dimethyl carbonate, and of lithium hexafluorophosphate ($LiPF_6$) (Electrolyte LP100).

c) Galvanostatic cycling

At ambient temperature, a current is imposed to the system to obtain a C/20 rate, that is, the extraction/insertion of a lithium ion within 20 hours.

Figure 8:
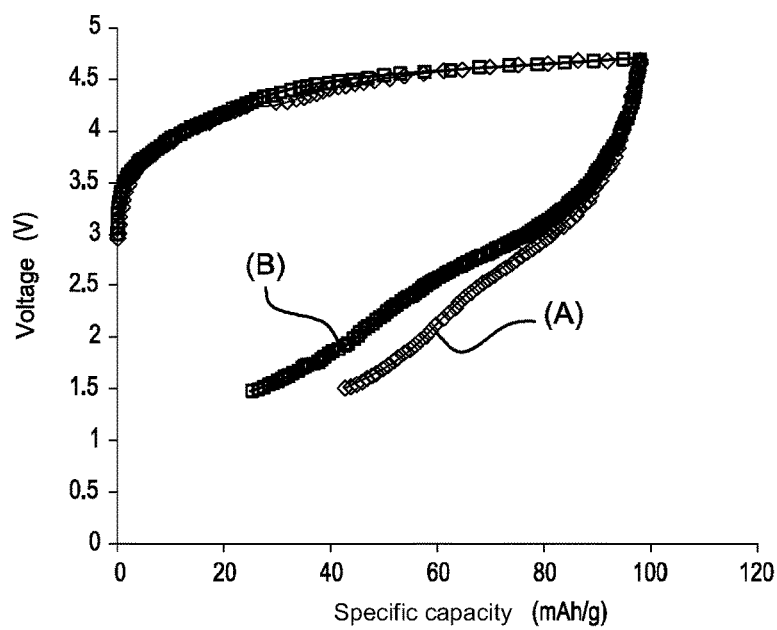
FIG. 8 corresponds to the C/20 galvanostatic cycling for the LiMn$_{0.7}$Co$_{0.3}$BO$_3$ compound obtained according to two embodiments of the invention.

FIG. 8 illustrates the specific capacity vs. the voltage for a positive electrode according to method A or according to method B.

4/ Characterization of the $LiMn_xCo_{1-x}BO_3$ Compound

FIG. 3 corresponds to an image obtained by scanning electron microscopy (SEM) of the $LiMn_{0.5}Co_{0.5}BO_3$ compound (x=0.5) obtained according to method A.

FIGS. 1 and 2 show the diffractograms (X rays) of the compounds according to the invention ($LiMn_xCo_{1-x}BO_3$ with x=0.3; 0.5; 0.7 obtained according to method A) as compared with the compound only containing manganese (x=1), $LiMnBO_3$ and the compound only containing cobalt (x=0), $LiCoBO_3$ obtained according to method A.

The diffractograms show the conservation of the structure of the material when x varies between 0 and 1. The evolution of the lattice parameters of the $LiMn_xCo_{1-x}BO_3$ material varies linearly with the insertion of cobalt into the material.

Figure 4:
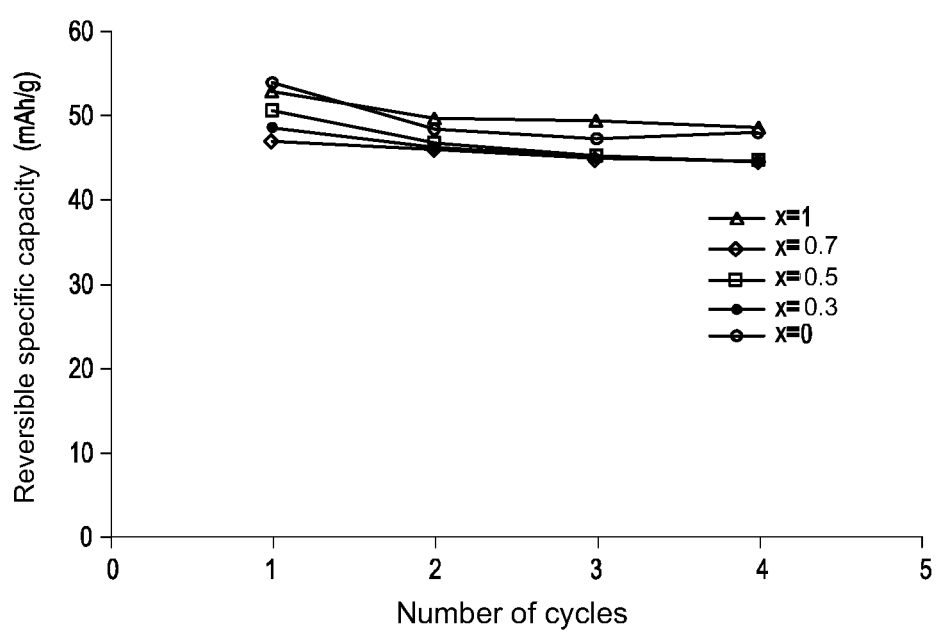
FIG. 4 corresponds to the graph of the reversible specific capacity of the LiMn$_x$Co$_{1-x}$BO$_3$ compound (x=0; 0.3; 0.5; 0.7; and 1) according to the number of cycles.

FIG. 4 corresponds to the graph of the reversible specific capacity of the $LiMn_xCo_{1-x}BO_3$ compound (x=0; 0.3; 0.5; 0.7; and 1) obtained according to method A according to the number of cycles.

Figure 11:
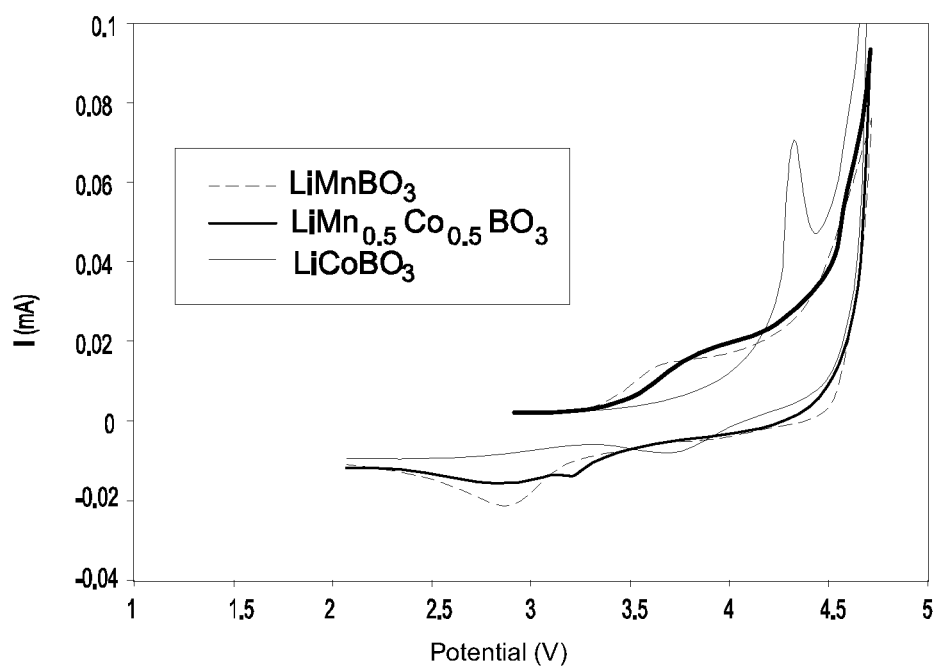
FIG. 11 corresponds to the voltammograms of the LiMnBO$_3$, LiMn$_{0.5}$Co$_{0.5}$BO$_3$, and LiCoBO$_3$ compounds.

The partial substitution of manganese with cobalt in the $LiMn_xCo_{1-x}BO_3$ material enables to increase the reaction potential of the material. Indeed, the average discharge potentials of materials $LiMnBO_3$, $LiMn_{0.5}Co_{0.5}BO_3$ and $LiCoBO_3$ respectively are 2.8 V; 3 V, and 3.1 V (FIG. 11).

Figure 5:
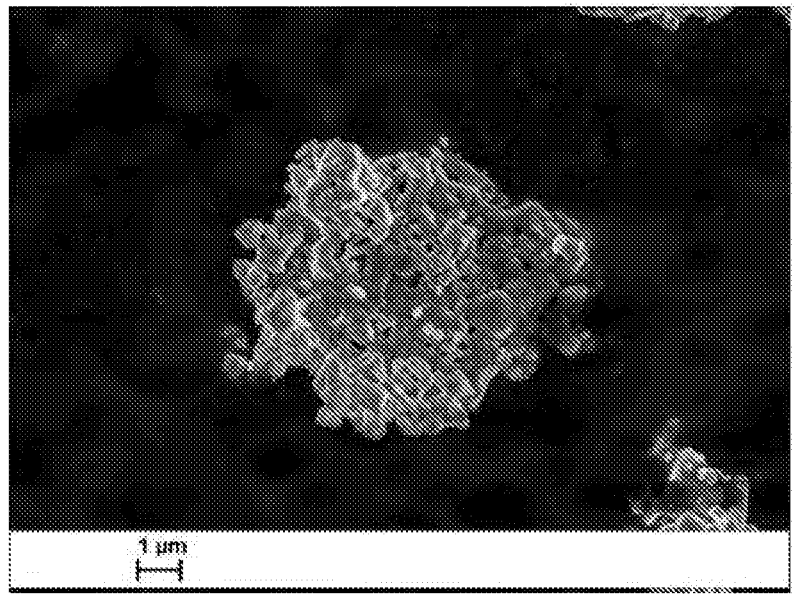
FIG. 5 is an image obtained by scanning electron microscopy (SEM) of the LiMn$_{0.7}$Co$_{0.3}$BO$_3$ compound according to a specific embodiment of the invention
Figure 6:
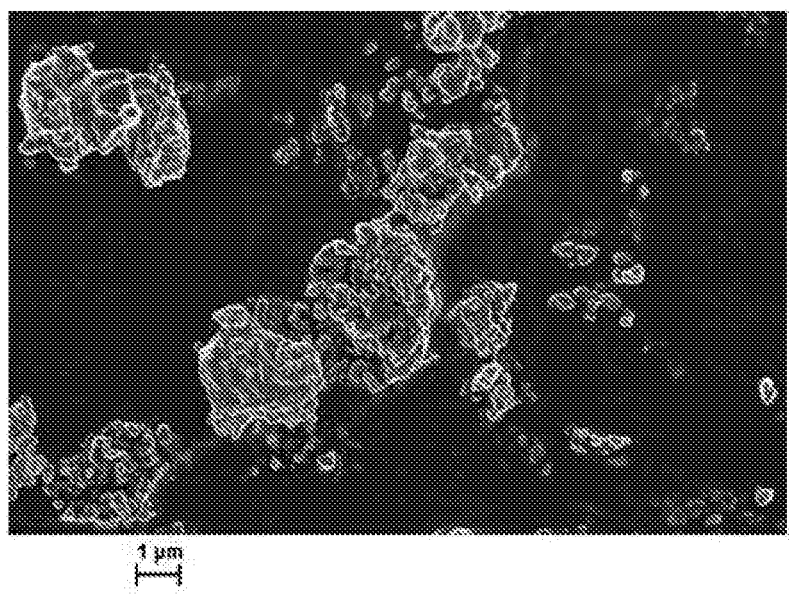
FIG. 6 is an image obtained by scanning electron microscopy (SEM) of the LiMn$_{0.7}$Co$_{0.3}$BO$_3$ compound according to a specific embodiment of the invention.

FIGS. 5 and 6 show that method B (quenching, FIG. 6) provides particles/agglomerates of smaller size than method A (longer thermal treatment, FIG. 5).

Figure 7:
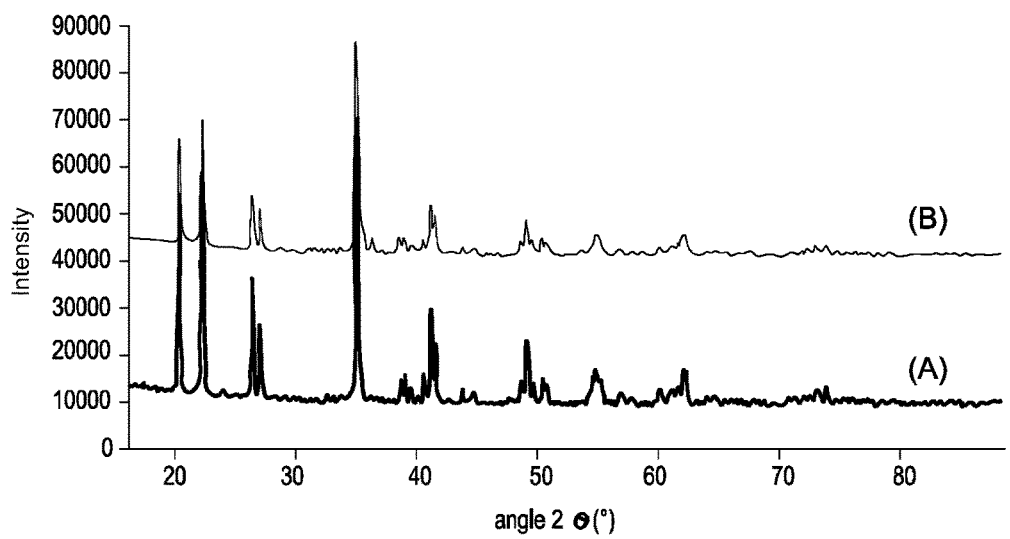
FIG. 7 corresponds to the diffractogram of the LiMn$_{0.7}$Co$_{0.3}$BO$_3$ compound according to two specific embodiments of the invention.

FIG. 7 corresponds to the diffractogram of the $LiMn_{0.7}Co_{0.3}BO_3$ compound obtained according to method A or method B.

Figure 9:
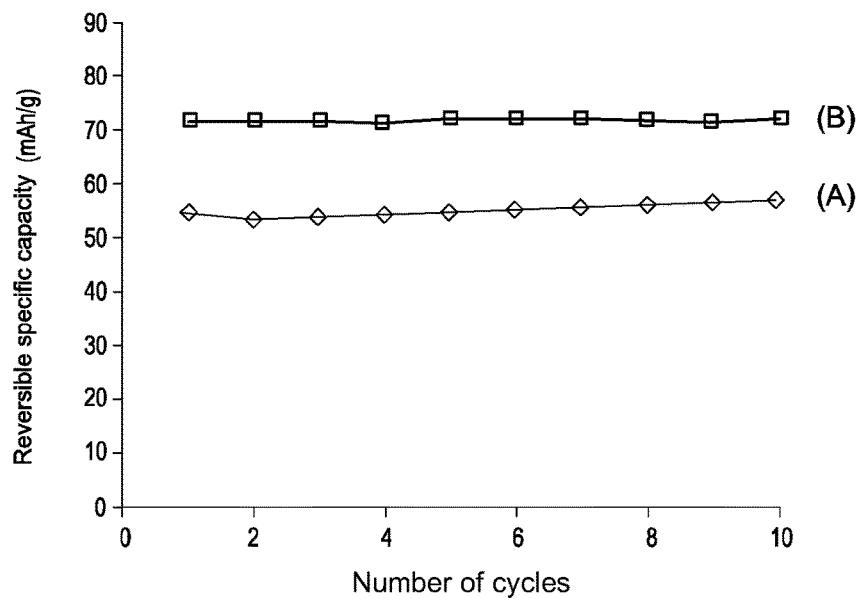
FIG. 9 corresponds to the reversible specific capacity of the LiMn$_{0.7}$Co$_{0.3}$BO$_3$ compound obtained according to two embodiments of the invention.

Method B provides particles/agglomerates having a smaller size, but also a greater reversible specific capacity at the $1^{st}$ cycle (54 vs. 70 mAh/g) and a better cycling stability, the initial reversible capacity being kept over 10 cycles (FIG. 9).

Methods A and B correspond to two embodiments of the present invention. They enable to separately synthesize manganese and cobalt borates such as $M_3B_2O_6$ (M=Mn or Co). Such a multiple-step synthesis enables to stabilize the cobalt in the II+ oxidation state during the forming of the mixed $LiMn_xCo_{1-x}BO_3$ compounds.

5/ Method C: Counter-Example: Synthesis of $LiMn_{0.7}Co_{0.3}BO_3$ in one Step

In this method, $MnC_2O_4.2H_2O$ and $Co(OH)_2$ are in stoichiometric proportion to obtain the $LiMn_{0.7}Co_{0.3}BO_3$ compound. The $LiOH.H_2O$ and $H_3BO_3$ precursors are slightly in excess.

These precursors are dispersed in cyclohexane and mixed for five hours at 500 revolutions per minute in a 50-ml bowl containing 10 stainless steel balls by means of a planetary mill (Retsch). The cyclohexane is evaporated in air.

A thermal treatment is then carried out in an alumina crucible under argon at 500° C. for 40 minutes.

Figure 10:
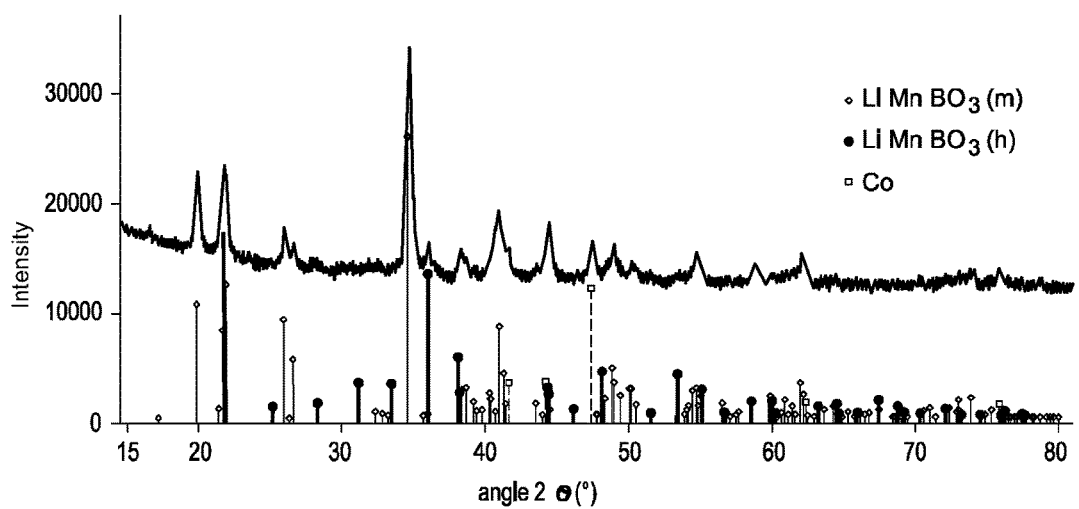
FIG. 10 corresponds to the diffractogram of the counter-example of the synthesis of the LiMn$_{0.7}$Co$_{0.3}$BO$_3$ compound.

The diffractogram of FIG. 10 shows that the $LiMn_{0.7}Co_{0.3}BO_3$ compound has not been obtained, but that the two polymorphous versions of $LiMnBO_3$, as well as metal cobalt, are present.

Accordingly, method C does not enable to obtain the $LiMn_xCo_{1-x}BO_3$ compound, given that the cobalt in the II+ oxidation state is reduced into metal cobalt during the thermal treatment. This method does not enable to partially substitute manganese with cobalt.

The invention claimed is:

1. A method of solid-state preparation of a material of formula $LiMn_xCo_{1-x}BO_3$, with $0 < x < 1$, comprising the steps of:
   a) preparing a manganese borate from a manganese compound and a boron compound by:
      a1) milling of a mixture of a manganese compound and of a boron compound;
      a2) thermal treatment of the mixture thus obtained, under an inert atmosphere, at a temperature in the range from 300 to 900° C.;
   b) preparing a cobalt borate from a cobalt compound and a boron compound by:
      b1) milling of a mixture of a cobalt compound and of a boron compound;
      b2) thermal treatment of the mixture thus obtained, under an oxidizing atmosphere, at a temperature in the range from 300 to 1,000° C.;
   c) preparing a mixture containing the manganese borate, the cobalt borate, a precursor of lithium, and boric acid;

d) thermally treating the mixture under an inert atmosphere;

e) obtaining a material of formula $LiMn_xCo_{1-x}BO_3$, with $0 < x < 1$.

2. The method of claim 1, wherein the manganese compound is selected from the group consisting of: manganese oxalate; manganese carbonate; and manganese oxide (II).

3. The method of claim 2, wherein the cobalt compound is selected from the group consisting of: cobalt oxalate; cobalt carbonate; and cobalt oxide (II).

4. The method of claim 3, wherein the boron compound is boron oxide or boric acid.

5. The method of claim 4, wherein the lithium precursor is lithium carbonate or lithium hydroxide.

6. The method of claim 5, wherein $0 < x \leq 0.7$.

7. The method of claim 3, wherein the lithium precursor is lithium carbonate or lithium hydroxide.

8. The method of claim 2, wherein the boron compound is boron oxide or boric acid.

9. The method of claim 8, wherein the lithium precursor is lithium carbonate or lithium hydroxide.

10. The method of claim 2, wherein the lithium precursor is lithium carbonate or lithium hydroxide.

11. The method of claim 2, wherein $0 < x \leq 0.7$.

12. The method of claim 1, wherein the cobalt compound is selected from the group consisting of: cobalt oxalate; cobalt carbonate; and cobalt oxide (II).

13. The method of claim 1, wherein the boron compound is boron oxide or boric acid.

14. The method of claim 1, wherein the lithium precursor is lithium carbonate or lithium hydroxide.

15. The method of claim 1, wherein the thermal treatment of step d) is carried out at a temperature in the range from 300 to 900° C., for a duration in the range from 30 to 1,200 minutes.

16. The method of claim 15, wherein $0 < x \leq 0.7$.

17. The method of claim 1, wherein it comprises the steps of:

a) preparing a manganese borate from a manganese compound and a boron compound, by thermal quenching under an inert atmosphere at a temperature in the range from 600 to 750° C. for a duration in the range from 5 to 20 minutes;

b) preparing a cobalt borate from a cobalt compound and a boron compound, by thermal quenching under an oxidizing atmosphere at a temperature in the range from 700 to 850° C. for a duration in the range from 5 to 20 minutes;

c) preparing and milling a mixture containing the manganese borate, the cobalt borate, a precursor of lithium, and boric acid;

d) thermally quenching the mixture under an inert atmosphere, at a temperature in the range from 400 to 550° C. for a duration in the range from 15 to 120 minutes;

e) obtaining a material of formula $LiMn_xCo_{1-x}BO_3$, with $0 < x < 1$.

18. The method of claim 1, wherein the thermal treatment of step d) is carried out at a temperature in the range from 400 to 700° C., for a duration in the range from 30 to 1,200 minutes.

19. The method of claim 1, wherein the boron compound is boron oxide or boric acid and the lithium precursor is lithium carbonate or lithium hydroxide.

20. The method of claim 1, wherein $0 < x \leq 0.7$.

* * * * *